L. R. RHOADES.
PROCESS OF MANUFACTURING DRY CELLS.
APPLICATION FILED FEB. 21, 1918.
1,281,421.
Patented Oct. 15, 1918.
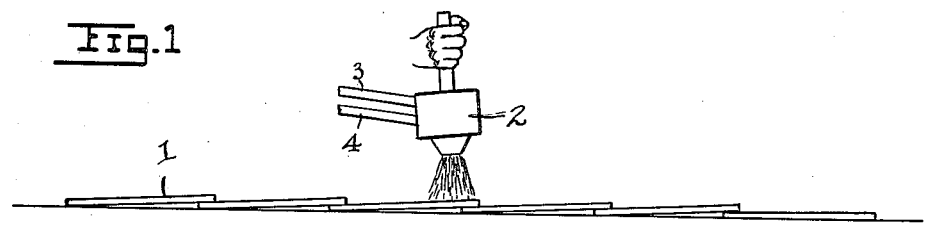
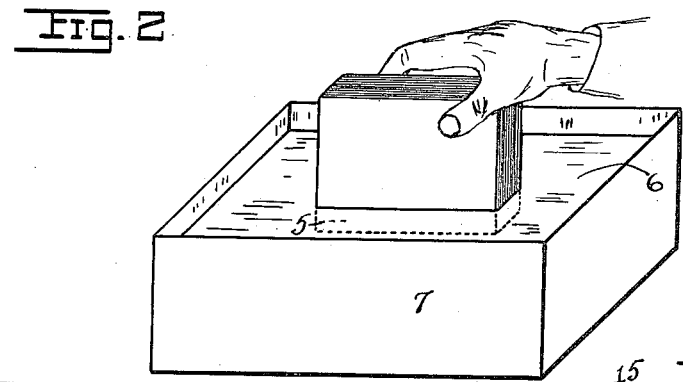
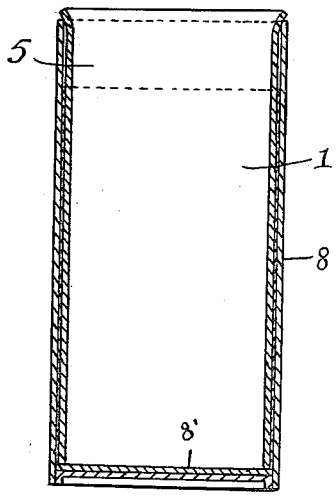
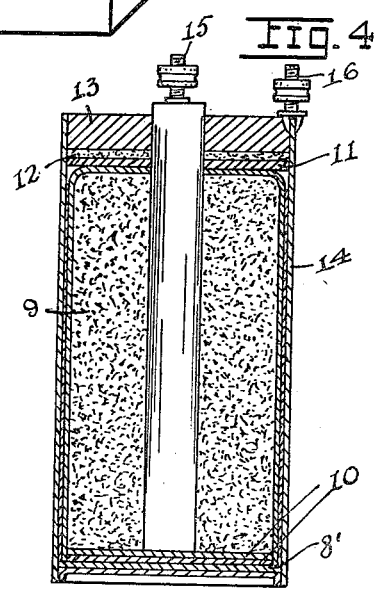
INVENTOR.
L. R. RHOADES
BY Ira J. Adams.
ATTORNEY

UNITED STATES PATENT OFFICE.

LLOYD R. RHOADES, OF FREMONT, OHIO, ASSIGNOR TO NATIONAL CARBON COMPANY, INC., A CORPORATION OF NEW YORK.

PROCESS OF MANUFACTURING DRY CELLS.

1,281,421. Specification of Letters Patent. Patented Oct. 15, 1918.

Application filed February 21, 1918. Serial No. 218,468.

*To all whom it may concern:*

Be it known that I, LLOYD R. RHOADES, a citizen of the United States, residing at Fremont, in the county of Sandusky and State of Ohio, have invented a certain new and useful Improvement in Processes of Manufacturing Dry Cells, of which the following is a full, clear, and exact description.

This invention relates to the manufacture of dry cells and is a continuation of my application filed January 5, 1916, Serial No. 70,407.

As is well known, a dry cell consists of a zinc can with a paper or other bibulous lining inside of which is compacted a depolarizing mix around a central carbon electrode. It has been the practice heretofore to apply a paste of flour and water, or analogous materials, to the bibulous lining before the lining was applied to the can, this being done by means of suitably driven rollers, by smearing it on with the hand, or by applying with a brush. I have devised a more expeditious way of applying the paste, which is of lower cost in practical operation and which beneficially affects the action of the cells.

My improved process is set forth in the following description and the annexed drawings in which:

Figure 1 is a view of the linings receiving the coating of paste.

Fig. 2 is a perspective view of the linings arranged for moistening a portion thereof.

Fig. 3 is a view of a zinc can having the lining in position, previous to the addition of the depolarizing mix.

Fig. 4 is a sectional view of a completed dry cell.

My process consists in arranging the bibulous linings 1 preferably in overlapped position as shown in Fig. 1, and applying the flour and water paste by means of a suitable spray 2 connected to a source of paste supply through a flexible tube 3 and to a source of compressed air by means of a similar tube 4. The flour paste is preferably uncooked and contains a suitable preservative such as mercuric chlorid. The spray device is moved by hand, or otherwise, longitudinally along the row of linings, with suitable movements from side to side to thoroughly and uniformly coat the exposed surfaces. It is important that the sprayer be inclined (to the right in Fig. 1) in such a way that the force of the spray will not be applied under the overlapped portions and blow the linings out of position.

After the linings are pasted in the manner specified, they are permitted to dry sufficiently to set the paste, after which they are dipped into water 6 in a suitable container 7, as shown in Fig. 2. The unpasted portion 5 only is submerged in water, and after a few seconds of soaking the bundle is removed and the linings are placed in position in the cans 8 on a cardboard disk 8'. The wet, unpasted portion 5 of the lining is flared out over the top of the can as shown in Fig. 3 to facilitate the insertion of the cardboard disks 10 and 11, which are preferably pushed into place after the lining is in the can so as to wedge the lining in position where it cannot be displaced in the subsequent wetting operation. The can, containing the lining and disks, is next filled with water either by dipping or by rolling through a tank subsequently inverted to pour out the excess water.

When the mix 9 is tamped into the cell the flared-over portion of the lining prevents the particles getting between the lining and the can. After the tamping operation is completed the lining 1 is turned down over the mix as shown in Fig. 4, and an annular disk or ring of corrugated pulpboard 11 is placed in position on top of the turned over lining. A layer of sand or other suitable material 12 is next added and the usual seal 13 applied, which finishes the manufacture of the cell, with the exception that it is necessary to add a protecting jacket 14 on the outside of the can and provide terminals 15 and 16 on the carbon and zinc electrodes respectively.

I have found that the uniformly sprayed coating reduces irregular corrosion of the zinc, and, while I am not sure of the reason for this, I believe it results from the reduction of concentration effects. When the lining is non-uniform, as necessarily results from prior processes of application, the thick portions of the paste differ in electrolyte concentration, from the thin portions of the paste. This produces a difference of potential, which tends to cause local short circuits and results in corrosion of the zinc on open as well as closed circuit.

It is quite important that the top portion of the lining have no flour paste sprayed onto it, as otherwise it would stick to the zinc can and could not be readily turned down over the top of the mix. Furthermore, the paste and the portion of the lining that would adhere to the top of the zinc would prevent the molten pitch or analogous material 13 from making a good seal with the top of the zinc can. This is avoided by leaving an unpasted strip along the top of the linings. The step of wetting the unpasted portion of the lining is also of value, as it would be difficult, if not impossible, to flare the lining out over the top of the zinc to aid in the insertion of the disks 10 which should be added before the entire lining is soaked with water. Also, if the entire lining was not moistened with water or electrolyte solution after it is applied to the zinc can, the diffusion of electrolyte from the mix 9 into the lining and coating of paste would be very slow and non-uniform. Consequently an unsatisfactory cell would result if this step were omitted, unless the mix were made decidedly wet, in which case it could not be satisfactorily tamped into the cell.

While various pastes of flour, meal, cornstarch, etc., may be utilized in my process, I prefer to use a paste of raw or uncooked flour and water, as claimed in the application of E. L. Marshall filed February 18, 1915, Serial No. 9,185.

Having described my invention, what I claim is:—

1. The steps in the method of making a dry cell, which consists in spraying a coating of paste on a bibulous lining, drying the lining sufficiently to set the paste, inserting the lining in a dry cell can with the coating of paste adjacent thereto, and then moistening the lining and paste.

2. The steps in the method of making a dry cell, which consists in spraying a coating of paste on the major portion of a bibulous lining, drying the lining sufficiently to set the paste, placing the lining in a dry cell can, with the unpasted portion of the lining at the top, filling the can with water to soak the lining and paste and pouring out the excess water.

3. The steps in the method of making a dry cell, which consists in spraying a coating of paste on a major portion of the bibulous lining, drying the lining sufficiently to set the paste, moistening the unpasted portion, adding the lining to a dry cell can with the coating of paste adjacent thereto and flaring the unpasted portion of the lining over the top of the zinc.

In testimony whereof, I hereunto affix my signature.

LLOYD R. RHOADES.